US006793223B2

(12) United States Patent
Ondrasik et al.

(10) Patent No.: US 6,793,223 B2
(45) Date of Patent: Sep. 21, 2004

(54) CONVERTIBLE STOCKING CART

(75) Inventors: V. John Ondrasik, Commerce, CA (US); Miguel J. Orozco, Lakewood, CA (US)

(73) Assignee: Precision Wire Racks and Carts, Inc., Commerce, CA (US)

( * ) Notice: Subject to any disclaimer, the term of this patent is extended or adjusted under 35 U.S.C. 154(b) by 9 days.

(21) Appl. No.: 10/139,696

(22) Filed: May 3, 2002

(65) Prior Publication Data

US 2003/0205875 A1 Nov. 6, 2003

(51) Int. Cl.[7] .................................................. B62B 11/00
(52) U.S. Cl. .............................. 280/47.35; 280/33.997; 280/79.3
(58) Field of Search ......................... 280/47.34, 47.35, 280/47.371, 79.3, 79.11, 33.997

(56) References Cited

U.S. PATENT DOCUMENTS

| | | | |
|---|---|---|---|
| 2,604,210 A | | 7/1952 | Boone |
| 2,735,201 A | | 3/1956 | Spears |
| 2,764,419 A | | 9/1956 | Enders |
| 2,992,010 A | | 7/1961 | Sides |
| 3,015,494 A | | 1/1962 | Fosbrook, Sr. |
| 3,027,174 A | | 3/1962 | Garbarino |
| 3,118,684 A | | 1/1964 | Kappen |
| 3,669,464 A | | 6/1972 | Linzmeier |
| 3,689,098 A | * | 9/1972 | Rubin .................... 280/33.998 |
| 3,698,733 A | * | 10/1972 | Isaacs ................... 280/33.998 |
| 3,782,746 A | * | 1/1974 | Isaacs ................... 280/33.996 |
| 3,813,111 A | | 5/1974 | Ruger |
| 3,977,689 A | * | 8/1976 | Rosa ..................... 280/33.996 |
| 4,165,088 A | * | 8/1979 | Nelson .................... 280/47.35 |
| 4,850,604 A | | 7/1989 | Le Marchand et al. |
| 5,033,757 A | | 7/1991 | Lloyd |
| 5,108,120 A | * | 4/1992 | Jarmusz et al. ............ 280/47.2 |
| 5,244,221 A | | 9/1993 | Ward |
| 5,507,507 A | | 4/1996 | Davidson |
| D370,330 S | * | 5/1996 | Carpenter et al. ........... D34/21 |
| 5,556,118 A | | 9/1996 | Kern et al. |
| 6,203,029 B1 | | 3/2001 | Ondrasik |
| 6,206,385 B1 | * | 3/2001 | Kern et al. ............... 280/47.35 |
| 6,260,863 B1 | | 7/2001 | Orozco et al. |
| 6,354,612 B1 | * | 3/2002 | Adamson ............... 280/33.992 |
| 6,497,423 B1 | * | 12/2002 | Perelli et al. ............ 280/47.34 |
| 2001/0005070 A1 | | 6/2001 | Kemnitzer |

FOREIGN PATENT DOCUMENTS

EP        0-352-647 A2      1/1990

* cited by examiner

Primary Examiner—Avraham Lerner
(74) Attorney, Agent, or Firm—Gordon & Rees LLP

(57) ABSTRACT

A wheeled cart has a generally flat base platform with a plurality of wheels supporting the platform above the ground. A handle frame extends upwardly from the rear end of the cart. The platform has a plurality of spaced, upwardly facing supports for releasably mounting accessories on the platform to extend upwardly from the platform. Accessories are provided for conversion of the cart between stocking and other purposes, including at least one horizontal support panel for supporting items at a location spaced above the platform and at least one vertical support frame for holding items at predetermined locations on the platform.

12 Claims, 4 Drawing Sheets

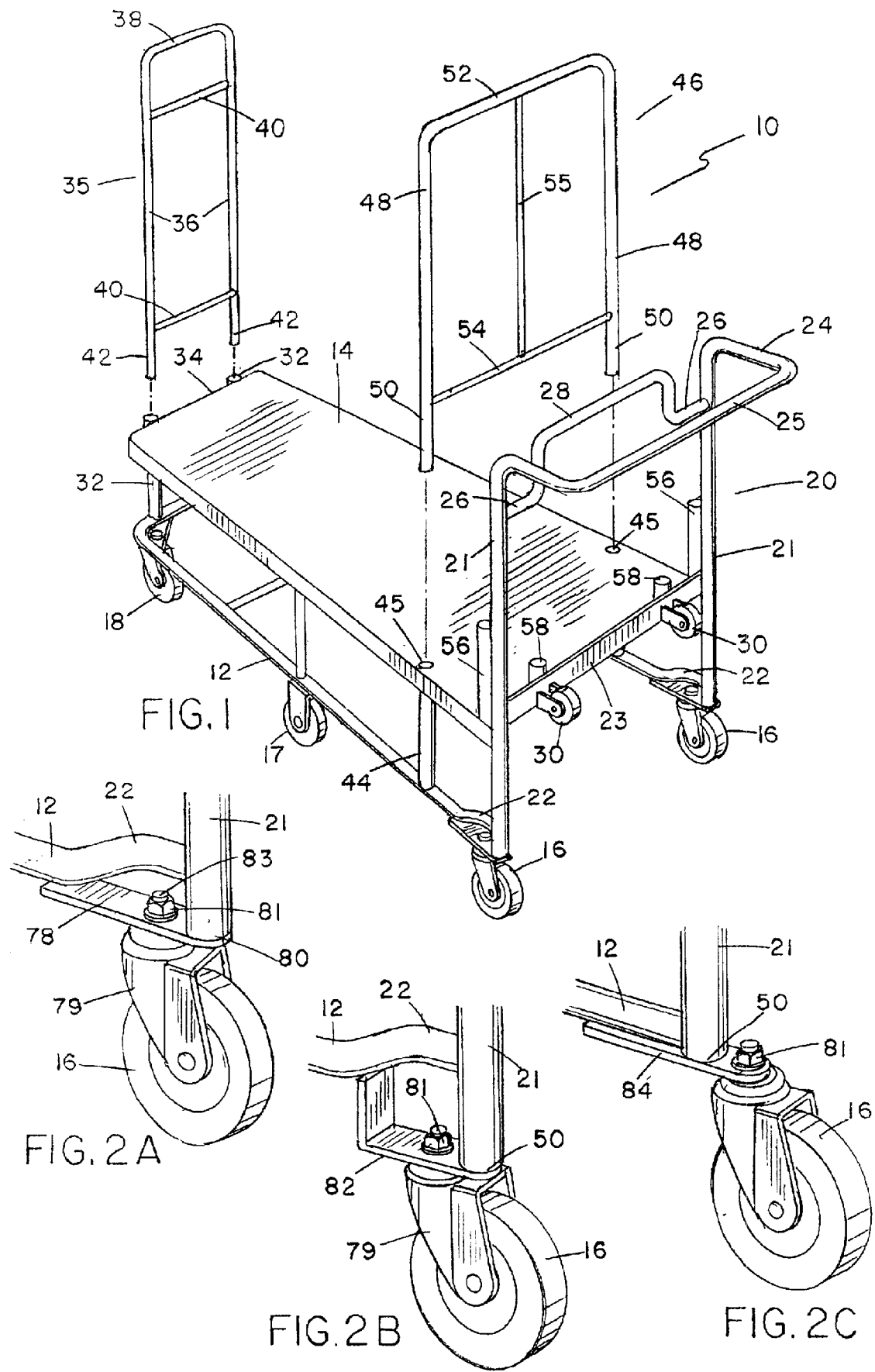

CONVERTIBLE STOCKING CART

BACKGROUND OF THE INVENTION

The present invention relates generally to wheeled carts as used in stores and the like for carrying items, and is particularly concerned with a stocking cart as used by store personnel in re-stocking shelves.

There are many different types of wheeled carts which are used for carrying items from one place to another, including the types of cart normally used in various types of stores, as well as carts or dollies used in industrial applications for moving materials, and luggage carts. Most such carts have a wheeled base, which may or may not have a platform for supporting items, and a handle projecting upwardly from the rear end of the base. Shopping carts used in grocery stores and the like to transport a number of relatively small items generally have a basket spaced above the wheeled base. Other, larger carts are used to transport larger items, either in stores, warehouses, or elsewhere, such as building or construction materials, electronics or other equipment, furniture, domestic appliances or the like. These include platform or flat bed carts which have a base comprising a generally flat platform for supporting goods, and lumber carts as used in hardware or construction material stores.

Some types of carts, particularly shopping carts, are designed to nest together in lines for storage and transportation purposes. Others, such as lumber carts and flat bed carts, often are not nestable and therefore take up a considerable amount of storage space when not in use. Some nesting arrangements are relatively complex, including hinged rear walls or bases which must pivot upwardly or inwardly in order to permit nesting. This has the disadvantage that any damage to the pivoting arrangement or adjacent areas of a cart may result in jamming, such that two carts can no longer be readily separated.

U.S. Pat. No. 6,203,029 of Ondrasik describes a nestable flat bed cart in which the base platform or deck has a rear, hinged portion which can lift up in order to allow the forward end of the platform of another cart to be nested under it. This does conserve some space, but it does require the base platform to include moving parts, and does not allow the forward end of a rear cart to be nested fully up to the forward end of the cart in front.

Although a conventional flat bed cart can carry relatively large items on the base platform, its carrying capacity is limited and there is no way of preventing smaller items from moving around on the platform. The platform is also quite low, requiring personnel using the carts to stock shelves to bend down repeatedly in order to retrieve items from boxes.

SUMMARY OF THE INVENTION

It is an object of the present invention to provide a new and improved wheeled cart for transporting items in stores, warehouses, and the like.

According to the present invention, a wheeled cart is provided, which comprises a generally flat platform having a front end, a rear end, opposite sides, a plurality of wheels supporting the platform above the ground, an upwardly extending handle frame extending upwardly from the rear end of the cart, the platform having spaced, upwardly facing supports for releasably mounting accessories on the platform to extend upwardly from the platform to support items on the platform or raised above the platform, the accessories comprising at least one horizontal support panel for supporting items at a location spaced above the platform and at least one vertical support frame for holding items at predetermined locations on the platform.

The handle frame may have a horizontal, box supporting portion at its upper end in order to support a box while store personnel remove items from the box in order to stock a shelf. The platform has a first pair of upwardly facing supports at a location spaced forwardly from the handle frame, for holding a vertical support frame parallel to and spaced a short distance from the handle frame in order to define a slot for holding empty boxes which have been folded flat. This enables an individual stocking store shelves to place a plurality of full boxes on the platform in front of the vertical support frame, and to successively position one box in turn on the horizontal box supporting portion of the handle frame while emptying the box. When the box is empty, it can be folded flat and placed in the slot between the handle frame and vertical support frame. This will make stocking of shelves much easier and more convenient. Thus, the cart of this invention may be readily converted from a platform cart to a stocking cart, and vice versa.

The platform may have another pair of upwardly facing supports at its forward end, for releasably holding another vertical support frame at the forward end of the platform. This will help to prevent items from falling off the platform. At the same time, the forward vertical support frame and the handle frame have cross bars at approximately the same height, and form a support for an upper support platform which has opposite ends releasably engaging the vertical support frame and handle frame to provide an upper support platform of similar dimensions to the base platform. This provides a convenient surface for store personnel to cut, package or otherwise prepare produce for sale. In an exemplary embodiment of the invention, the base platform is provided with further supports adjacent the handle frame, and at least one accessory is provided for engaging the further supports. This accessory comprises a raised platform which is shorter than the length of the base platform and which has support legs which engage in the further supports in the base platform. Other accessories which may be provided include a basket which may be designed to hang from the box supporting portion of the handle frame, in order to carry small items.

In an exemplary embodiment of the invention, the opposite sides of the platform taper inwardly from the rear to the front end of the cart, and the platform has a downwardly facing recessed area extending from the rear end to the front end, and the platform being fixed and having no parts which move relative to the handle frame, whereby the front end of the platform of a second identical cart can be nested under the platform of the first-mentioned cart and into the downwardly facing, recessed area such that the platform of the second cart is positioned beneath the platform of the first-mentioned cart.

In an exemplary embodiment of the invention, one or more rotatable members such as casters, wheels, rollers, bearings, or the like may be provided either at the rear end or the front end of the platform, for assisting with nesting of the carts. If provided at the rear end of the platform, the rotating member or members are designed to engage the front end of a second cart as it is pushed into the first cart from behind, and then roll smoothly over the flat upper surface of the platform of the second cart as it is pushed under the platform of the cart in front. It will be understood that the rear wheels of the forward cart will be lifted from the ground as the rear cart platform is pushed underneath the front cart platform. This also helps to reduce wear on the rear wheels as a line of nested carts are moved between a parking lot and the store. In the alternative arrangement, where one or more rotating members are provided at the front end of the platform, these will engage the smooth, flat undersurface of the platform of the front cart as a second cart platform is pushed underneath. In either case, the rotating member or members will assist in the smooth nesting of the platform of one cart under the platform of the cart in front.

The convertible, nestable stocking cart of this invention is easily convertible for a number of different uses and operations, simply by adding or removing various accessories on the base platform. It is provided with a box stand to hold boxes at a convenient height while stocking shelves, as well as an accessory to define a slot or compartment for holding emptied boxes. Other accessories may be used to add a raised short or long platform spaced above the base platform, for additional storage space.

BRIEF DESCRIPTION OF THE DRAWINGS

The present invention will be better understood from the following detailed description of an exemplary embodiment of the invention, taken in conjunction with the accompanying drawings in which like reference numerals refer to like parts and in which:

FIG. 1 is a rear perspective view of the stocking cart according to an exemplary embodiment of the invention showing two accessories in position for attachment;

FIGS. 2A–2C are enlargements showing alternative caster mounting arrangements;

DETAILED DESCRIPTION OF THE DRAWINGS

Figure 9:
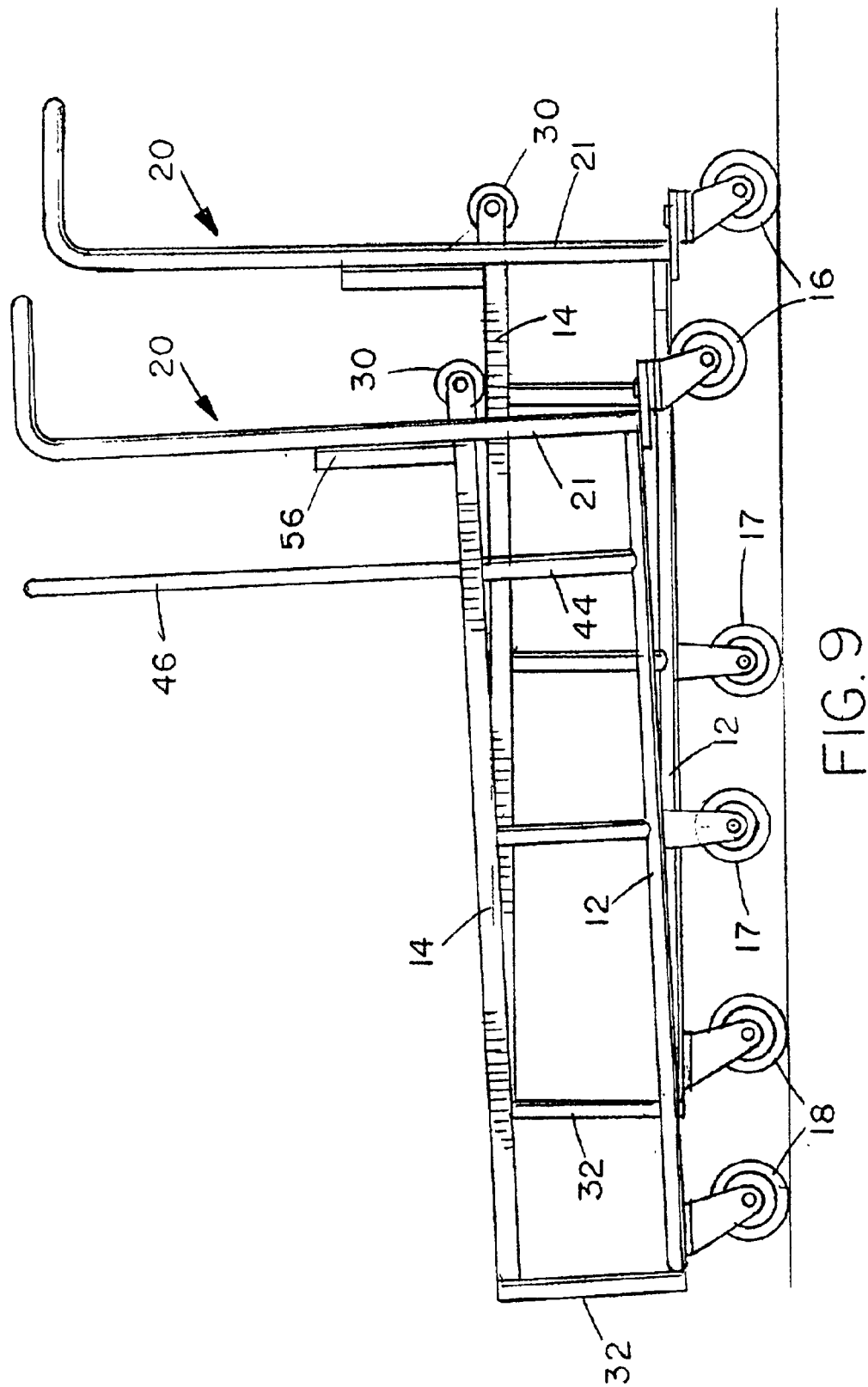
FIG. 9 is a side view showing two carts nested.

FIG. 1 of the drawings illustrates a stocking cart 10 of the flat bed or platform type according to an exemplary embodiment of the invention, while FIG. 9 illustrates nesting of two carts 10. The cart 10 basically comprises a wheeled base frame 12 and a flat base or platform 14 carried above the frame 12. A pair of rear caster wheels 16, a center pair of wheels 17, and a pair of forward caster wheels 18 are mounted on base frame 12 at the rear, center and forward ends of the frame, respectively. The cart may be readily converted from a platform cart to a stocking cart, as described below.

An upright handle frame 20 has legs 21 which project upwardly from the rear ends 22 of base frame 12, and which are secured to the rear end 23 of the platform 14. The handle frame 20 has a rearwardly directed, horizontal support portion 24 at its upper end, formed by rearwardly directed portions of the legs 21 which are secured together via handle bar 25 at their rear ends. A cross bar 26 extends between the legs 21 adjacent the horizontal support portion 24, and has a raised central portion 28 aligned with handle bar 25 to form part of the horizontal support portion or stand 24, as best illustrated in FIGS. 1 and 3.

A pair of nesting guide wheels or casters 30 project rearwardly from the rear end 23 of platform 14. The nesting structure of the cart 10 is the same as described in a copending application of Orozco filed on even date herewith and entitled "Nestable Cart", assigned to the same assignee as the present application, the contents of which are incorporated herein by reference.

Figure 3:
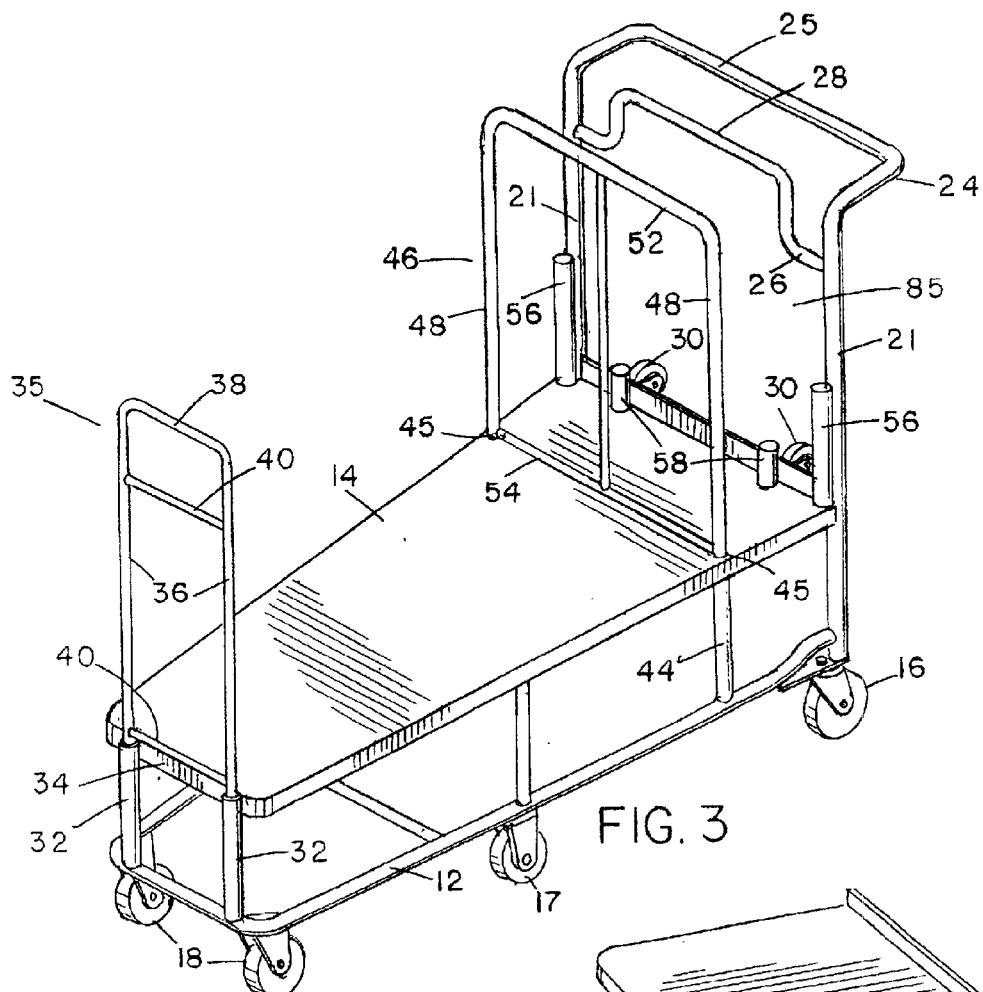
FIG. 3 is a front perspective view of the cart with the accessories attached.

The platform 14 has a plurality of supports for releasably supporting various accessories which are illustrated in FIGS. 1,3,4 and 5. A first pair of supports comprises a pair of upright hollow tubular posts 32 which extend upwardly between the forward end of the frame and the forward end 34 of the platform 14. A first accessory for releasable mounting on the cart using posts 32 comprises a generally U-shaped vertical support frame 35, as illustrated in FIG. 1 prior to mounting on the cart. The vertical support frame 35 has a pair of vertical legs 36 connected together by a cross bar 38 at their upper ends, with additional spaced cross bars 40 extending between the legs at spaced heights for added strength and rigidity. The lower ends 42 of the legs 36 are inserted into the upper ends of the posts 32 as illustrated in FIGS. 1 and 3. In the installed position of FIG. 3, the vertical support frame will help to hold items placed on platform 14 on the cart, reducing the risk of any items falling off the front end of the platform.

A second pair of vertical, hollow support posts 44 extends between the base frame 12 and the platform 14 at a location spaced forwardly a short distance from the rear ends of the frame and platform. The platform 14 has openings 45 adjacent its opposite side edges which communicate with hollow posts 44. A second U-shaped vertical support frame 46 of larger dimensions than frame 35 is provided for releasable engagement in openings 45 and posts 44, as illustrated in FIGS. 1 and 3. Frame 46 has vertical legs 48 with lower ends 50 for engagement in the openings 45 and aligned posts 44 as indicated in FIG. 3, and a cross bar 52 connecting the legs at their upper ends. A further cross bar 54 extends between the legs adjacent their lower ends, and a vertical bar 55 extends between the center of bar 54 and upper cross bar 52 for added rigidity and support.

A further pair of vertical, hollow support posts 56 extend upwardly from the opposite, rear corners of the platform 14, adjacent the legs 21 of the handle frame, as best illustrated in FIGS. 1 and 3. A pair of shorter hollow support posts 58 extend upwardly from the rear end of the platform at locations spaced inwardly from posts 56.

Figure 4:
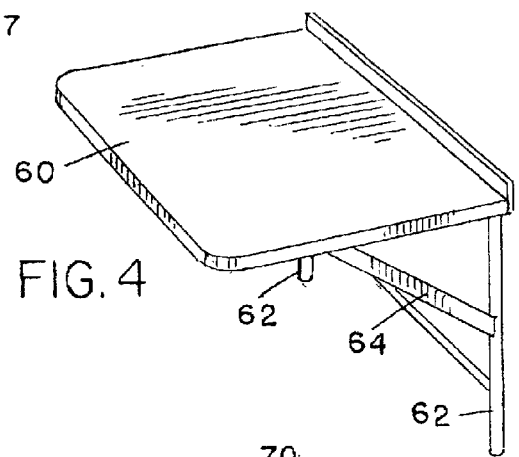
FIG. 4 is a perspective view of a tray accessory.
Figure 5:
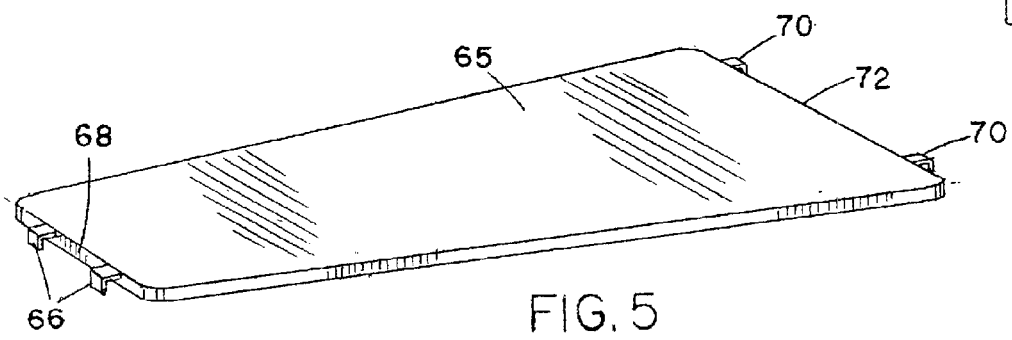
FIG. 5 is a perspective view of a full tray accessory.
Figure 6:
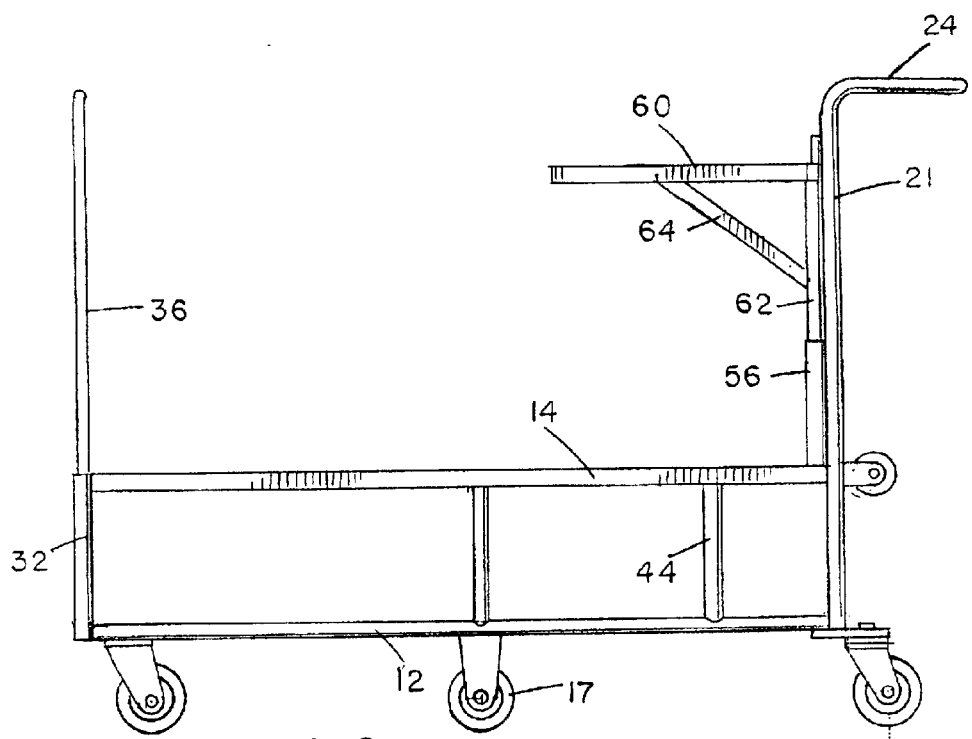
FIG. 6 is a side view of the cart with the tray accessory attached.

FIGS. 4 to 7 illustrate additional accessories which may be selectively mounted on the cart 10. FIG. 4 illustrates a short support panel 60 having a pair of vertical support legs 62 at its rear end, with a support strut 64 extending from each leg to a location on panel 60 spaced forwardly from the rear end, to form a triangular support for the horizontal platform or panel 60, as best illustrated in FIG. 6. The lower ends of legs 62 are inserted in the corner support posts 56 as indicated in FIG. 6 in order to support the panel 60 at a location spaced above platform 14, providing an additional support surface for smaller items. This provides a convenient raised surface or table for use in making notes, cutting foods, or other preparation of products prior to stocking of shelves.

Figure 7:
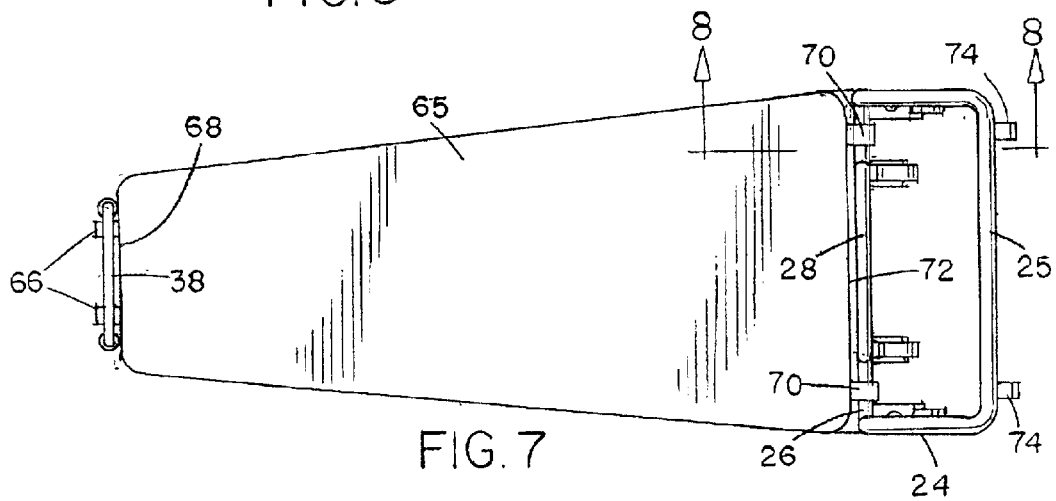
FIG. 7 is a top view of the cart with the shelf accessory attached.
Figure 8:
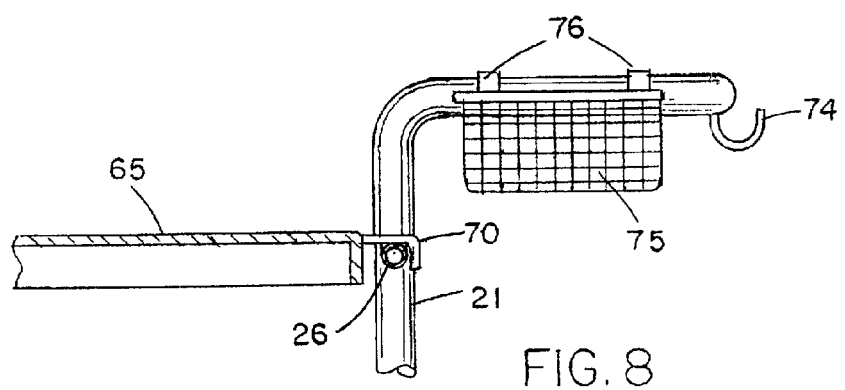
FIG. 8 is an enlarged sectional view taken on line 8—8 of FIG. 7 and showing an optional basket accessory.

FIG. 5 illustrates a longer support platform 65 of larger dimensions than panel 60. The shape and dimensions of platform 65 are similar to those of the base platform 14. Platform 65 has a pair of hooks 66 at its forward end 68 and a pair of hooks 70 at rear end 72. The hooks 66 are engaged over the upper cross bar 40 of vertical frame 35, and the hooks 70 are engaged over the handle frame cross bar 26, as indicated in FIGS. 7 and 8, in order to install platform 65 on the cart. This provides an additional raised support platform 65 above base platform 14, significantly increasing the carrying capacity of the cart. In order to install platform 65, the front vertical support frame 35 must be installed, while the second vertical support platform is removed.

As best illustrated in FIGS. 7 and 8, the handle bar 25 may also be provided with a pair of spaced hooks 74 for carrying bags and the like. Additionally, as indicated in FIG. 8, a further accessory comprising a small basket 75 may be provided for suspending from the horizontal, box supporting portion or stand 24 of the handle frame, via hooks 76 engaging over the horizontal portion of each leg 21. This will enable relatively small items to be carried on the cart without risk of losing the items. Alternatively, the horizontal portions of the legs 21 may be provided with hooks for suspending basket 75.

FIGS. 2A to 2C illustrate three alternative ways of mounting the rear casters 16 on the base frame 12 of cart 10. In the prior art, the rear casters were generally secured in the lower ends of the handle frame tubes by rivets or via a threaded insert. However, the wheel mounts tend to become loose over time, leading to poor operation of the cart. In the cart of this invention, the casters are instead bolted securely to a flat mounting bar secured across the lower ends 80 of each of the handle bar vertical legs 21, rather than directly in the lower ends of the legs. It will be understood that the locked caster mounting arrangement of FIGS. 2A to 2C may alternatively be used on other types of wheeled carts, such as other types of platform carts, lumber carts, shopping carts, and platter carts.

FIG. 2A illustrates the mounting of FIGS. 1 and 2, in which the rear end 22 of each side of the frame 12 is raised and welded to the respective handle frame leg 21 at a location spaced above the lower end of the leg. A bar 78 is then welded between the lower end 80 of leg 21 and the side of the frame, with the caster housing 79 secured to bar 78 via locking nut 81 engaging over the threaded end of shaft 83, as indicated in FIG. 2A.

In the alternative of FIG. 2B, the flat bar 78 is replaced with an angle bar 82, but the mount is otherwise identical to that of FIG. 2A. In FIG. 2C, the respective sides of frame 12 have no raised portions, but are welded directly to the lower ends 80 of the legs 21. A flat mounting bar 84 is welded across the lower end of the leg 21 to project forwardly from the leg, and the caster is mounted on the forward end of bar 84.

The alternative configurations of the cart will now be described in more detail. The configuration illustrated in FIG. 3 may be used when a cart is used to stock shelves in stores, for example. In this configuration, the first vertical frame 35 is mounted in posts 32 at the front end of the platform, and the second vertical frame 46 is mounted in posts 44, to define a compartment or slot 85 between frame 46 and handle frame 20 to hold flat items such as empty, flattened boxes, panels, pictures, or the like. In this configuration, full boxes carrying items for re-stocking shelves may be placed on the platform 14 between vertical frames 35 and 46. On arriving at a shelf to be stocked, a box can be placed on the box support stand 24 at the upper end of handle frame 20, where it will be at a convenient height for the individual stocking the shelf, such that they do not have to bend over to retrieve items in the box. Once the box is empty, it can be flattened or folded and placed upright in compartment 85 between frame 46 and handle frame 20. The procedure is repeated until the shelves are stocked and the boxes are all emptied.

If it is desired to use the cart 12 as a conventional flat bed or platform cart, the front vertical frame 35 can be removed from posts 32, and placed into posts 58 at the rear end of the cart, adjacent the handle frame, for storage purposes. Frame 48 can also be removed, if desired, or left in place if the user desires to have a vertical storage compartment 85 for flat items such as wood panels, pictures, and the like. If additional storage or item carrying space is required, one of the flat platforms 60 or 65 may be readily installed, as indicated in FIG. 6 or FIGS. 7 and 8. Basket 75 may be added as needed.

When the cart is not in use, it may be readily nested with other such carts as indicated in FIG. 9. As has been noted above, the cart of this invention is nested in an identical manner to the nesting platform cart described in our co-pending application entitled "Nestable Cart", of Miguel J. Orozco, referred to above, and filed on even date herewith. FIG. 9 illustrates two carts 10 nested together, but it will be understood that additional carts may be nested with the first two in an equivalent manner. In order to nest two carts, the rear cart 10 is pushed into the back of the forward cart 10. The base frames 12 are both open at the rear of the cart and taper inwardly from the rear to the front of the cart to permit nesting. The forward end of the platform 14 of the rear cart will first contact the nesting guide wheels 30 at the rear of the front cart, and the guide wheels 30 will ride up over platform 14, lifting the platform and the center and rear caster wheels 16 of the front cart from the ground. The nesting guide wheels will ensure that the two carts can be smoothly and easily nested together into the position indicated in FIG. 6. This arrangement will also raise the central and rear wheels from the ground to reduce wear and dragging when a line of carts is transported from a parking lot to a store, for example.

The nesting guide wheels 30 at the rear of the cart may be replaced with any of the alternative nesting arrangements defined in our copending application identified above. For example, nesting guide wheels may be provided at the front end of the platform 14 rather than the rear end. The separate guide wheels may be replaced with a single roller or other curved nesting formations.

Although the stocking cart 10 of FIGS. 1 to 9 is provided with nesting guide wheels in the illustrated embodiment, it may also be provided without any specific nesting formations in other embodiments. In this case, it will still provide the versatility of converting from various different possible configurations depending on the current use of the cart, potentially replacing several different carts with a single convertible cart. In either case, the cart can be readily converted between a configuration suitable for stocking shelves to other configurations suitable for transporting various different size items, such as a platform or flat bed cart configuration.

Although an exemplary embodiment of the invention has been described above by way of example only, it will be understood by those skilled in the field that modifications may be made to the disclosed embodiment without departing from the scope of the invention, which is defined by the appended claims.

We claim:

1. A wheeled cart, comprising:
   a generally flat platform having a front end, a rear end, and opposite sides;
   a plurality of wheels supporting the platform above the ground;
   an upwardly extending handle frame extending upwardly from the rear end of the cart;
   the platform having a plurality of spaced, upwardly facing supports for releasably mounting accessories on the platform to extend upwardly from the platform;
   the accessories comprising at least one horizontal support panel for supporting items at a location spaced above the platform and at least one vertical support frame for holding items at predetermined locations on the platform;
   the opposite sides of the platform tapering inwardly from the rear to the front end of the cart, and the platform has a downwardly facing recessed area extending from the rear end to the front end, the platform being fixed and having no parts which move relative to the handle frame, whereby the front end of the platform of a second identical cart can be nested under the platform of the first-mentioned cart and into the downwardly facing, recessed area such that the platform of the second cart is positioned beneath the platform of the first-mentioned cart.

2. The apparatus as claimed in claim 1, including at least one rotatable member mounted on the cart and extending rearwardly from the handle frame adjacent the rear end of the platform, the rotatable member comprising guide means for engaging the platform of a second cart as it is nested under the platform of the first-mentioned cart.

3. The apparatus as claimed in claim 1, wherein the handle frame has a horizontal, box supporting stand at its upper end for supporting a box.

4. The apparatus as claimed in claim 1, wherein the supports include a first pair of upwardly facing supports at a location spaced forwardly from the handle frame, and the vertical support frame has legs for releasable engagement in said first pair of supports to extend parallel to and spaced a short distance from the handle frame to define a compartment for holding empty boxes which have been folded flat.

5. The apparatus as claimed in claim 4, wherein the supports include a second, forward pair of upwardly facing supports at the front end of the platform, and the accessories include a second vertical support frame for releasable engagement in said forward pair of supports.

6. The apparatus as claimed in claim 1, wherein the supports include a rear pair of upwardly facing supports at the rear end of the platform and said horizontal support panel has a pair of legs for releasable engagement in said rear pair of supports to support the support panel horizontally at a location spaced above the platform.

7. The apparatus as claimed in claim 1, including a basket for releasably mounting on the handle frame for holding small items.

8. The apparatus as claimed in claim 1, wherein the supports comprise hollow posts having open upper ends for receiving said accessories.

9. The apparatus as claimed in claim 1, wherein said wheels comprise a forward pair of wheels and a rear pair of caster wheels, the handle frame has a pair of vertical legs on opposite sides of the platform, the handle frame legs having lower ends, and a mounting bar is secured across the lower end of each handle frame leg, each caster wheel being bolted to a respective one of said mounting bars.

10. A wheeled cart, comprising:
    a generally flat platform having a front end, a rear end, and opposite sides;
    a plurality of wheels supporting the platform above the ground;
    an upwardly extending handle frame extending upwardly from the rear end of the cart;
    the platform having a plurality of spaced, upwardly facing supports for releasably mounting accessories on the platform;
    the accessories comprising at least two horizontal support panels of different sizes for selectively mounting on the platform for supporting items at a location spaced above the platform and at least one vertical support frame for holding items at predetermined locations on the platform; and
    the supports including a first pair of upwardly facing supports at a location spaced forwardly from the handle frame, and the vertical support frame having legs for releasable engagement in said first pair of supports to extend parallel to and spaced a short distance from the handle frame to define a compartment for holding empty boxes which have been folded flat;
    the supports further including a second, forward pair of upwardly facing supports at the front end of the platform, and the accessories including a second vertical support frame for releasable engagement in said forward pair of supports; and
    the supports further including a rear pair of upwardly facing supports aligned with the forward pair of supports for relasably supporting said second vertical support frame in a stored position adjacent the handle frame when not in use.

11. A wheeled cart, comprising:
    a generally flat platform having a front end, a rear end, and opposite sides;

a plurality of wheels supporting the platform above the ground;

an upwardly extending handle frame extending upwardly from the rear end of the cart;

the platform having a plurality of spaced, upwardly facing supports for releasably mounting accessories on the platform;

the accessories comprising at least two horizontal support panels of different sizes for selectively mounting on the platform for supporting items at a location spaced above the platform and at least one vertical support frame for holding items at predetermined locations on the platform;

the supports including a first pair of upwardly facing supports at a location spaced forwardly from the handle frame, and the vertical support frame having legs for releasable engagement in said first pair of supports to extend parallel to and spaced a short distance from the handle frame to define a compartment for holding empty boxes which have been folded flat;

the supports further including a second, forward pair of upwardly facing supports at the front end of the platform, and the accessories including a second vertical support frame for releasable engagement in said forward pair of supports; and wherein a first one of said horizontal support panels releasably mountable on the platform is of substantially the same dimensions as the base platform, the first horizontal support platform having a forward end and a rear end, and hooks at the forward and rear end for releasable engagement over the second vertical support frame and handle frame, respectively, to hold the support platform horizontally at a spaced height above the base platform.

12. A wheeled cart, comprising:

a generally flat platform having a front end, a rear end, and opposite sides;

a plurality of wheels supporting the platform above the ground;

an upwardly extending handle frame extending upwardly from the rear end of the cart;

the platform having a plurality of spaced, upwardly facing supports for releasably mounting accessories on the platform;

the accessories comprising at least two horizontal support panels of different sizes for selectively mounting on the platform for supporting items at a location spaced above the platform and at least one vertical support frame for holding items at predetermined locations on the platform; and wherein a first one of said horizontal support panels is of substantially the same dimensions as the base platform and a second one of said horizontal support panels is of a length less than that of said first horizontal support panel.

* * * * *